United States Patent Office 2,917,393
Patented Dec. 15, 1959

2,917,393

PRODUCTION OF METAL COMPOSITIONS

Charles J. Carignan, Wilmington, Del., assignor to E. I. du Pont de Nemours and Company, Wilmington, Del., a corporation of Delaware No Drawing. Application November 10, 1954
Serial No. 468,166

6 Claims. (Cl. 106—39)

This invention relates to compositions containing a metal from group IV-A of the periodic table and silicon, and more particularly to novel methods for preparing such compositions or alloys. More specifically, it relates to novel titanium and silicon compositions having a titanium content greater than 20 weight percent and substantially free of oxides.

Titanium-silicon compositions have already been investigated to determine the various possible phases and present a system of great metallurgical interest (PB-111508, "Constitution of Titanium Alloy Systems," page 104, reporting work of Hansen et al. in Trans. ASM-44, 1952, 518–536). In this work materials prepared from mixtures of pure titanium metal and elemental silicon have been utilized. The preparation of these compositions by this method requires that pure titanium and pure silicon be separately produced and then combined by thermal means. Several other methods for obtaining such compositions have also been proposed and in which various types of reactions are resorted to. Thus, early electric furnace workers attempted to reduce rutile with carbon to produce titanium metal which was then mixed with silicon. However, the resulting titanium-silicon product was very impure and contained relatively large amounts of carbon as an impurity. In U.S. Patent 1,019,526, alloys containing iron and impure carbon-containing compositions are prepared by the reacting titanium dioxide, silicon dioxide and carbon. Thermit or Goldschmidt type (Goldschmidt in Liebigs Annalen 306, pp. 19–28 (1898), and F. Wohler ibid. 103 p. 235 (1857)) of reductions of titanium dioxide or potassium fluotitanate and silicon dioxide by the use of aluminum and silicon are also known, but an undesirably impure material is also obtained from these reductions. Titanium dioxide and ferro-silicon can be fed into an arc melted bath of a clay-lime mixture serving as a fluxing bath to dissolve the silicon dioxide produced by the reaction. This method also provides impure materials, especially alloys of iron, titanium and silicon. Hence, in all of these prior attempts an impure alloy product containing, usually, carbon, iron and residual oxides results.

It is among the objects of this invention to overcome these and other disadvantages of prior group IV-A metal and silicon compositions and to provide novel and effective methods for obtaining these objects. A particular object of this invention is to enable production of titanium silicon compositions or alloys which are free of oxides and carbon. A further object is to produce such compositions without the necessity of resorting to pure titanium metal as an alloying component. An additional object is to produce a titanium-silicon composition by a simple thermal process and from a titaniferous oxide through a process in which objectionable contaminating impurities and reaction products are eliminated from the composition by volatilization. Further objects and advantages of the invention will be apparent from the following description.

These and other objects are realized by this invention which comprises obtaining a substantially oxide-free group IV-A metal and silicon alloy composition by mixing an oxidic compound of a group IV-A metal, particularly titanium, zirconium and hafnium, with an amount of silicon which is at least the atomic equivalent of the oxygen in said oxidic compound, heating the mixture in a closed reaction vessel while maintained free of contaminating atmospheric components to a temperature in excess of 1415° C., vaporizing silicon monoxide therefrom, continuing said heating until the reaction is substantially complete, and subsequently recovering the desired metal-silicon composition.

In a more specific and preferred embodiment the invention comprises preparing an oxide-free titanium-silicon composition or alloy containing more than 20 weight percent titanium by intimately mixing a titaniferous oxide material, such as ilmenite, with an amount of silicon at least the atomic equivalent of the oxygen in said material, heating the mixture in a closed reactor vessel adapted to prevent atmospheric component contamination by inleakage to a temperature ranging from 1500° C to 1900° C., vaporizing silicon monoxide therefrom, continuing said heating until the reaction is substantially completed, and subsequently recovering the titanium-silicon composition.

In practically adapting the invention, use can be made of any oxidic compounds, minerals, or slags containing the group IV-A metals, of which titanium is an example, having compositions containing varying amounts of oxides of the alkaline earth metals with oxides of aluminum and usually iron oxides associated with the titanium oxide content. Traces of oxides of other elements such as manganese, vanadium and chromium can also be present in these materials. Examples thereof include $TiO_2$, $ZrO_2$, $HfO_2$, ilmenite, rutile, zircon, baddeleyite, etc. These are mixed in finely divided state intimately with the desired quantity of silicon. The mixture is then heated within a closed reactor disposed within a suitable furnacing electrical heating means, to temperatures of at least 1450° C. to about 1900° C., and preferably, in the instance of titanium, to temperatures ranging from about 1500–1700° C., and until completion of the desired reaction. Thereafter the metal-silicon alloy product is recovered from the reactor. The following chemical equations illustrate some of the reactions possible using a stoichiometric amount of silicon for reaction with a representative oxidic titanium slag in which these materials are encountered:

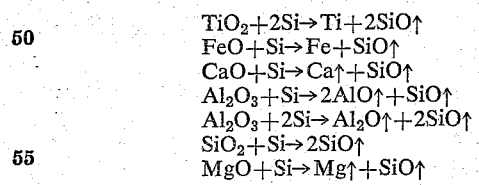

To a clearer understanding of the invention the following examples are given in which parts mentioned are by weight. These are merely illustrative and are not in limitation of my invention.

*Example I*

Eight parts of $TiO_2$ were mixed with 14.0 parts of elemental Si (150% excess Si). The mixture was placed in a graphite crucible and gradually heated in an evacuated furnace. Evolution of SiO, which condensed on the water-cooled walls of the furnace, began at 1415° C., the melting point of Si (PB-111508, supra). The charge was finally taken to 1690° C., and then allowed to cool. The product was found to be a fused metallic mass, and from the weight loss, it was concluded that most of the excess Si had volatilized with the SiO. The product was examined by X-ray diffraction and found to consist essentially of Ti metal. Lines of the TiO pattern were significantly absent. It was necessary to use excess Si because of the volatility of the element at the temperatures employed.

Example II 100 parts of a slag composition were mixed with 144 parts of Si, or a quantity sufficient to reduce all the oxides present with the silicon being oxidized to SiO and a 100% excess Si. The slag contained the following:

[Si equivalents for slag reduction     Basis: 100 parts.]

|  | Percent | Atoms of O | Equiv.×Si | Parts Si |
|---|---|---|---|---|
| $TiO_2$ | 60.78 | 0.762×2 | 1.524×28= | 42.67 |
| $Ti_2O_3$ | 10.92 | 0.076×3 | 0.228 | 6.38 |
| Fe | 0.22 | | | |
| FeO | 9.08 | 0.126×1 | 0.126 | 3.53 |
| $Fe_2O_3$ | 0.63 | 0.004×3 | 0.012 | 0.336 |
| CaO | 0.94 | 0.017×1 | 0.017 | 0.476 |
| MgO | 5.29 | 0.132×1 | 0.132 | 3.696 |
| MnO | 0.41 | 0.058×1 | 0.058 | 1.624 |
| $Al_2O_3$ | 6.70 | 0.066×3 | 0.198 | 5.544 |
| $SiO_2$ | 5.1 | 0.085×2 | 0.170 | 4.760 |
| $V_2O_5$ | 0.47 | 0.002×5 | 0.010 | 2.800 |
| $Cr_2O_3$ | 0.41 | 0.003×3 | 0.009 | 0.025 |
| $P_2O_5$ | 0.02 | negligible | | |
| | | | | 71.841 |

The mixture was placed in a graphite crucible and heated in an evacuated furnace to 1600° C. until reaction was complete. The metallic product analyzed 20.39% Ti, 77.15% Si, 0.73% C, total 99.97%, and contained 86.75 atom percent Si, and, from its phase diagram, consisted of $TiSi_2+Si$. X-ray diffraction measurements confirmed the presence of Si and $TiSi_2$, and the absence of TiO, TiC, and $Ti_5Si_3$. Spectrographic analysis disclosed that the product was not homogeneous with respect to iron; i.e., iron and iron silicides had segregated in the reaction mass. Aluminum was significantly absent, having been reduced to a volatile lower oxide which escaped. The content of Ca and Mg had been reduced to 100 and 15 p.p.m. respectively, although the original slag had contained about 1 and 6% lime and magnesia, respectively.

Example III

Ten parts of a slag composition containing the oxides mentioned in Example II were mixed with 10.8 parts of Si, or the equivalent amount plus a 50% excess. The mixture was heated in an evacuated furnace to 1650° C. The product was found to be a sintered metallic powder which contained 67.0% Ti, 32.3% Si, 0.6% C. From the phase diagram, this should consist of $Ti_5Si_3$, which was confirmed by X-ray diffraction measurements. Spectrographic analysis disclosed that iron had segregated, Al was absent, and the content of Ca and Mg had been diminished to the parts per million range.

The amount of silicon used herein and the temperature conditions in the reaction are important variants in my process. At least a 1-1 atomic ratio between the elemental silicon and the oxygen existing in the titaniferous oxide or other oxidic compound is required, with more silicon being employable, depending upon the type of metal-silicon composition desired. Any desired type of commercially available silicon product can be used, and as above noted, the temperature of the reaction is mainlained above the melting point of elemental silicon, that is above 1415° C. The rate at which the reaction proceeds can be varied by changing the temperature and the pressure utilized for the reaction. Changes in these conditions affect the rate at which the silicon monoxide is removed from the reaction mixture. The rate of vaporization is increased by an increase in the temperature of the reaction or by a decrease in the partial pressure of the silicon monoxide in the vapor existing in the reaction chamber. The pressure of the silicon monoxide in the reactor may be decreased by decreasing the total pressure over the reaction mixture or by passing an inert gas through or over the reaction mixture. These variants in the process affect the driving force which removes the silicon monoxide from the reaction space and causes the reaction to proceed and produce the desired products. The volatile impurities are also removed in the vapor state with the silicon monoxide by-product vapors.

While particularly described as applied to the preparation of titanium-silicon compositions, the invention, as already stated, is eminently suited for the production of metal silicon compositions from the general class of the group IV–A metals, titanium, zirconium, and hafnium, as well as mixtures thereof with silicon. The group IV–A metal oxide containing material can be treated in the same manner as the titaniferous oxide raw materials in the above examples.

The metals and alloys obtained by this process possess utility as metal addition materials, as hard compositions useful in cermets, and as abrasion resistant materials. Of particular interest in the composition $Ti_5Si_3$, a high melting point hard compound useful for cermet composition and as a high temperature oxidation resistant material. The low melting compositions in the titanium-silicon phase diagram are useful for feeding to an electrolytic cell anode compartment in which the titanium-silicon composition is treated by electrolytic action to remove a portion of the titanium which is reduced to the metal at the cathode of the cell. This serves as a method to recover titanium metal from the titanium-silicon composition.

I claim as my invention:

1. A process for producing a substantially oxide-free metal-silicon composition which comprises heating a mixture of an oxidic group IV–A metal selected from the group consisting of titanium, zirconium and hafnium with an amount of silicon in excess of the atomic equivalent of the oxygen present in said metal, effecting said heating within a closed reaction vessel and while free from atmospheric contaminants at a temperature of about 1415° C. and up to 1900° C., vaporizing silicon monoxide from the reaction product, continuing said heating until the reaction is substantially completed, and recovering the resulting metal silicon composition.

2. A process for producing a substantially oxide-free metal-silicon composition which comprises heating a mixture of an oxidic group IV–A metal selected from the group consisting of titanium, zirconium and hafnium with an amount of silicon in excess of the atomic equivalent of the oxygen present in said metal, effecting said heating within a closed reaction vessel and while free from atmospheric contaminants at a temperature ranging from about 1500° C. 1900° C., vaporizing silicon monoxide from the reaction product, continuing said heating until the reaction is substantially completed, and recovering the resulting metal silicon composition.

3. A process for producing an oxide-free titanium-silicon composition containing more than 20 weight percent titanium, comprisng mixing a titaniferous oxide with an amount of silicon in excess of the atomic equivalent of the oxygen in said oxide, heating the mixture to a temperature of about 1415° C. and up to 1900° C., in a closed reaction vessel adapted to prevent inleakage contaminating atmospheirc components, and vaporizing silicon monoxide from the reaction product, continuing said heating until substantial completion of the reaction is effected, and recovering the resulting titanium-silicon composition.

4. The process of claim 3 in which metal oxide impurities and silicon are removed from the reaction products and vessel in the vapor state with the silicon monoxide byproduct vapors evolved in the process.

5. A process for the preparation of an oxide-free titanium-silicon composition which comprises mixing titanium dioxide with an amount of silicon in excess of the atomic equivalent of the oxygen present in said dioxide, heating said mixture in a reaction vessel maintained free of contaminating atmospheric components and to a temperature ranging from about 1500–1900° C., continuing said heating until substantial completion of said reaction is effected, vaporizing silicon monoxide and excess silicon from the reaction product and recovering the titanium metal-silicon product.

6. A process for the preparation of an oxide-free zirconium-silicon composition which comprises mixing zirconium oxide with an amount of silicon in excess of the atomic equivalent of the oxygen present in said oxide, heating said mixture in a reaction vessel maintained free of contaminating atmospheric components and to a temperature ranging from about 1500–1900° C., continuing said heating until substantial completion of said reaction is effected, vaporizing silicon monoxide and excess silicon from the reaction product and recovering the zirconium metal-silicon product.

References Cited in the file of this patent

FOREIGN PATENTS 294,267    Germany _____ 1916